United States Patent
Cho et al.

(10) Patent No.: US 9,672,819 B2
(45) Date of Patent: Jun. 6, 2017

(54) LINGUISTIC MODEL DATABASE FOR LINGUISTIC RECOGNITION, LINGUISTIC RECOGNITION DEVICE AND LINGUISTIC RECOGNITION METHOD, AND LINGUISTIC RECOGNITION SYSTEM

(71) Applicant: Samsung Electronics Co., Ltd., Suwon-si, Gyeonggi-do (KR)

(72) Inventors: Kyung-sun Cho, Seoul (KR); Young-Il Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 14/205,843

(22) Filed: Mar. 12, 2014

(65) Prior Publication Data

US 2014/0288936 A1 Sep. 25, 2014

(30) Foreign Application Priority Data

Mar. 21, 2013 (KR) ........................ 10-2013-0030290

(51) Int. Cl.
*G10L 15/18* (2013.01)
*G06F 17/24* (2006.01)
*G06F 17/27* (2006.01)
*G10L 15/22* (2006.01)

(52) U.S. Cl.
CPC ............ *G10L 15/18* (2013.01); *G06F 17/242* (2013.01); *G06F 17/276* (2013.01); *G06F 17/277* (2013.01); *G10L 2015/227* (2013.01)

(58) Field of Classification Search
CPC ..... G10L 15/183; G10L 15/06; G10L 15/065; G10L 15/07
See application file for complete search history.

(56) References Cited

U.S. PATENT DOCUMENTS

| | | | | |
|---|---|---|---|---|
| 5,832,063 | A * | 11/1998 | Vysotsky | G10L 15/065 379/189 |
| RE38,101 | E * | 4/2003 | Vysotsky | G10L 15/065 379/189 |
| 7,505,905 | B1 * | 3/2009 | Zimmerman | G10L 15/065 704/244 |
| 2001/0028742 | A1 | 10/2001 | Gunji et al. | |
| 2004/0088162 | A1 * | 5/2004 | He | G10L 15/063 704/235 |
| 2004/0156562 | A1 * | 8/2004 | Mulvey | G06F 3/0237 382/310 |

(Continued)

FOREIGN PATENT DOCUMENTS

| | | |
|---|---|---|
| JP | 2009-205350 A | 9/2009 |
| KR | 10-2005-0032649 A | 4/2005 |
| WO | 2012/027095 A1 | 3/2012 |

*Primary Examiner* — Douglas Godbold
(74) *Attorney, Agent, or Firm* — Jefferson IP Law, LLP (57) ABSTRACT

A method of building a database for a linguistic recognition device is provided The method includes storing common linguistic model data configured to infer a word or a sentence from a character acquired by recognizing a language input by a user in a storage section of a linguistic recognition device, collecting recognition-related information related to the user after storing the common linguistic data, and analyzing the collected recognition-related information to be stored as individual linguistic model data.

20 Claims, 9 Drawing Sheets

(56) References Cited

U.S. PATENT DOCUMENTS

| | | | |
|---|---|---|---|
| 2004/0162728 A1* | 8/2004 | Thomson | G10L 15/07 704/255 |
| 2006/0058999 A1* | 3/2006 | Barker | G09B 5/04 704/256 |
| 2006/0074656 A1* | 4/2006 | Mathias | G10L 15/063 704/243 |
| 2006/0206544 A1* | 9/2006 | Oks | G06F 11/1451 |
| 2007/0247436 A1* | 10/2007 | Jacobsen | G06F 1/1626 345/173 |
| 2008/0077404 A1* | 3/2008 | Akamine | G10L 15/065 704/243 |
| 2011/0066433 A1* | 3/2011 | Ljolje | G10L 15/07 704/236 |
| 2011/0246184 A1* | 10/2011 | Gilbert | G10L 15/193 704/9 |
| 2011/0301953 A1* | 12/2011 | Lee | G10L 15/187 704/243 |
| 2012/0053935 A1* | 3/2012 | Malegaonkar | G10L 15/07 704/235 |
| 2012/0109646 A1* | 5/2012 | Bak | G10L 15/065 704/229 |
| 2012/0143605 A1 | 6/2012 | Thorsen et al. | |
| 2012/0166178 A1 | 6/2012 | Latzina et al. | |
| 2012/0239382 A1* | 9/2012 | Shen | G06F 17/30699 704/9 |
| 2013/0030802 A1* | 1/2013 | Jia | G10L 15/06 704/231 |
| 2013/0294587 A1* | 11/2013 | Arrowood | G10L 15/07 379/88.01 |
| 2013/0332147 A1* | 12/2013 | Corfield | G10L 15/065 704/201 |
| 2014/0039893 A1* | 2/2014 | Weiner | G06F 3/167 704/249 |
| 2015/0149174 A1* | 5/2015 | Gollan | G10L 15/285 704/246 |

* cited by examiner

LINGUISTIC MODEL DATABASE FOR LINGUISTIC RECOGNITION, LINGUISTIC RECOGNITION DEVICE AND LINGUISTIC RECOGNITION METHOD, AND LINGUISTIC RECOGNITION SYSTEM

CROSS-REFERENCE TO RELATED APPLICATION(S)

This application claims the benefit under 35 U.S.C. §119 (a) of a Korean patent application filed on Mar. 21, 2013 in the Korean Intellectual Property Office and assigned Serial No. 10-2013-0030290, the entire disclosure of which is hereby incorporated by reference.

TECHNICAL FIELD

The present disclosure relates to an apparatus and a method for recognizing a language input by a user. More particularly, the present disclosure relates to a linguistic model database for linguistic recognition, a linguistic recognition device, a linguistic recognition method and a linguistic recognition system in which individual linguistic model data from recognition-related information is taken into account in addition to general linguistic model data so as to improve precision of the linguistic recognition.

BACKGROUND

With the development of technological devices, input interface methods have been developed to accept input in various forms, such as a touch, a gesture, writing recognition, voice recognition, and so on. Most new input methods for terminals are based on recognition technology. In the case of the writing recognition, the voice recognition, or the like, recognition technology for recognizing a language is needed, and thus a recognition device may need a linguistic model-based process.

A structure of a linguistic recognition device varies depending on the relevant recognition technology.

Figure 1:
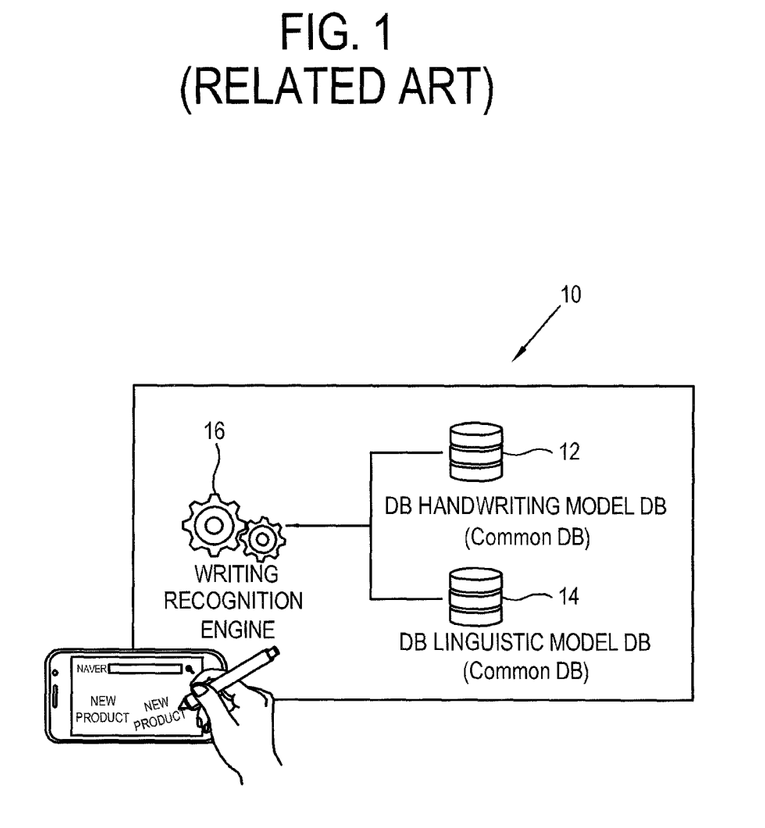
FIG. 1 is a schematic view showing a linguistic recognition system according to the related art.

FIG. 1 is a schematic view showing a linguistic recognition device according to the related art.

Referring to FIG. 1, the writing recognition language-based system 10 of the related art may operate as follows. First, handwriting pixel information from a writing input image, handwriting information based on a writing order, or the like, are obtained and then a character is recognized through a writing recognition engine 16 and a handwriting model database 12. Then, a word or a sentence is inferred by comparing the recognized character with a word or a sentence from a stored common linguistic model database 14. Next, a recognition result is determined from results recognized in a unit of a character or in a unit of a word or sentence.

In the word or sentence recognition, recognized characters linguistically constitute a word or a sentence, and results misrecognized in the unit of the character are corrected by comparison with similar words or sentences. The recognition engine needs a word database based on the linguistic model for a word recognition unit. In the case of a stand-alone recognition engine, a common linguistic model database 14 for storing general information for the recognition linguistic model is embedded in the recognition engine by taking general users into account. The common linguistic model data is optimized to accommodate many general users and thus updated over a significantly long period. Also, a training tool may be provided in accordance with the recognition engine. However, in this case a user has to train the engine, for example, by inputting a word to be trained, and other related processes.

Since the linguistic model database of the recognition engine is optimized to accommodate a general group of users, word recognition inference results may cause deterioration in recognition performance with regard to words (e.g., an abbreviation, etc.), to slang, to tone of voice, or the like, characteristically used by individuals, with regard to newly-coined words, informal terms, vulgar words, or the like, with regard to a person, a place name, or similar proper noun following a trend, or with regard to technical terms, informal terms, or the like, restrictively used in a group to which users belong (e.g., an age group, a school, a hobby society, or the like).

Therefore, a need exists for a device, a method and a system for providing a linguistic model database which improves the precision of linguistic model probability inference in linguistic recognition.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a linguistic model database for compensating precision in linguistic model probability inference for linguistic recognition, and a method of building the same.

Another embodiment may provide a linguistic recognition device and method in which a user linguistic model database is provided according to users and specified to respective users of the linguistic recognition device.

Still another embodiment may provide a linguistic recognition device and method in which a linguistic pattern is analyzed according to users or a user member group, thereby carrying out linguistic model probability inference for linguistic recognition.

Yet another embodiment may provide a cloud server with an individual linguistic model database of which recognition-related information is collected and analyzed by a plurality of client devices being used by a user.

Still another embodiment may provide a linguistic recognition system, in which a linguistic model database of a linguistic recognition device is updated with individual linguistic model data collected in a cloud server.

In accordance with an embodiment of the present disclosure, at least one non-transitory processor readable medium for storing a database configured to be readable by at least one processor for instructing the at least one processor to execute a computer process, wherein the database includes common linguistic model data configured to infer a word or a sentence from a character acquired by recognizing a language input by a user, and individual linguistic model data configured to infer a word or sentence related to a user by collecting recognition-related information transmitted through one or more client devices used by a user after storing the common linguistic data and analyzing the collected recognition-related information is provided.

In an embodiment, the individual linguistic model data may be acquired by at least one of analyzing an individual unique language pattern, by analyzing user member group language pattern, and by analyzing a real-time word on the Web.

In an embodiment, the stored individual linguistic model data may be updated with individual linguistic model data stored in a cloud server.

In an embodiment, the common linguistic model data and the individual linguistic model data may be respectively stored in different data areas.

In an embodiment, the language input by a user may include a voice or a character.

In an embodiment, the individual linguistic model data of the cloud server may be acquired by analyzing the recognition-related information collected and transmitted through one or more client devices used by a user.

In an embodiment, the recognition-related information may be collected for a predetermined period of time through one or more client devices used by a user and transmitted.

In accordance with another embodiment of the present disclosure, a method of building a database for a linguistic recognition device is provided. The method includes storing common linguistic model data configured to infer a word or a sentence from a character acquired by recognizing a language input by a user in a storage section of the linguistic recognition device, collecting recognition-related information related to the user after storing the common linguistic model data, and analyzing the collected recognition-related information to be stored as individual linguistic model data.

In an embodiment, the individual linguistic model data may be acquired by at least one of analyzing an individual unique language pattern, by analyzing user member group language pattern, and by analyzing a real-time word on the Web.

In an embodiment, the analysis may be performed in the cloud server, and the analyzed and acquired individual linguistic model data is stored in a storage section of a cloud server.

In an embodiment, the analysis may be performed with respect to recognition-related information collected and the recognition-related information is transmitted through one or more client devices used by the user.

In an embodiment, the recognition-related information may be collected for a predetermined period of time and transmitted to the cloud server.

In an embodiment, the stored individual linguistic model data may be updated with the individual linguistic model data stored in the cloud server.

In accordance with another embodiment of the present disclosure, a linguistic recognition device is provided. The device includes a user language input section through which a user inputs a language, a character recognition unit configured to recognize a character from the language input through the user language input section, a database, and a word recognition unit configured to infer a word or a sentence based on the common linguistic model data and the individual linguistic model data stored in the storage section from the character recognized by the character recognition unit, wherein the database includes common linguistic model data configured to infer a word or a sentence from a character acquired by recognizing a language input by a user, and individual linguistic model data configured to infer a word or a sentence related to a user by collecting recognition-related information transmitted through one or more client devices used by a user after storing the common linguistic data and analyzing the collected recognition-related information.

In an embodiment, the individual linguistic model data may be acquired by at least one of analyzing an individual unique language pattern, by analyzing user member group language pattern, and by analyzing a real-time word on the Web.

In an embodiment, the linguistic recognition device may further include a communication section which communicates with a cloud server.

In an embodiment, the individual linguistic model data stored in the storage section may be updated with individual linguistic model data stored in the cloud server.

In an embodiment, the common linguistic model data and the individual linguistic model data may be respectively stored in different data areas.

In an embodiment, the user language input section may include at least one of a voice input microphone and a character input interface.

In an embodiment, the individual linguistic model data stored in the cloud server may be acquired by analyzing the recognition-related information collected and transmitted through one or more client devices used by a user.

In an embodiment, the recognition-related information may be collected for a predetermined period of time through one or more client devices used by a user, and transmitted to the cloud server through the communication section.

In accordance with another embodiment of the present disclosure, a linguistic recognition method is provided. The method includes building a database, receiving a language input by a user, recognizing a character from the input language, and recognizing a word by inferring a word or a sentence based on stored common linguistic model data and individual linguistic model data from the recognized character, wherein the database includes common linguistic model data configured to infer a word or a sentence from a character acquired by recognizing a language input by a user, and individual linguistic model data configured to infer a word or a sentence related to a user by collecting recognition-related information through one or more client devices used by a user after storing the common linguistic data and analyzing the collected recognition-related information.

In an embodiment, the individual linguistic model data may be acquired by at least one of analyzing an individual unique language pattern, by analyzing user member group language pattern, and by analyzing a real-time word on the Web.

In an embodiment, the individual linguistic model data stored in the storage section may be updated with the individual linguistic model data stored in a cloud server.

In an embodiment, the common linguistic model data and the individual linguistic model data may be respectively stored in different data areas of a single storage section.

In an embodiment, the language input by a user may be received through at least one of a voice input microphone and a character input interface.

In an embodiment, the individual linguistic model data stored in the cloud server may be acquired by analyzing the recognition-related information collected and transmitted through one or more client devices used by a user.

In an embodiment, the recognition-related information may be collected for a predetermined period of time through one or more client devices used by a user, and transmitted to the cloud server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following embodiments, an object to be recognized is a 'language'. In other words, an intended language is recognized through a writing character in the form of an image, or through a voice in the form of frequency.

Figure 2:
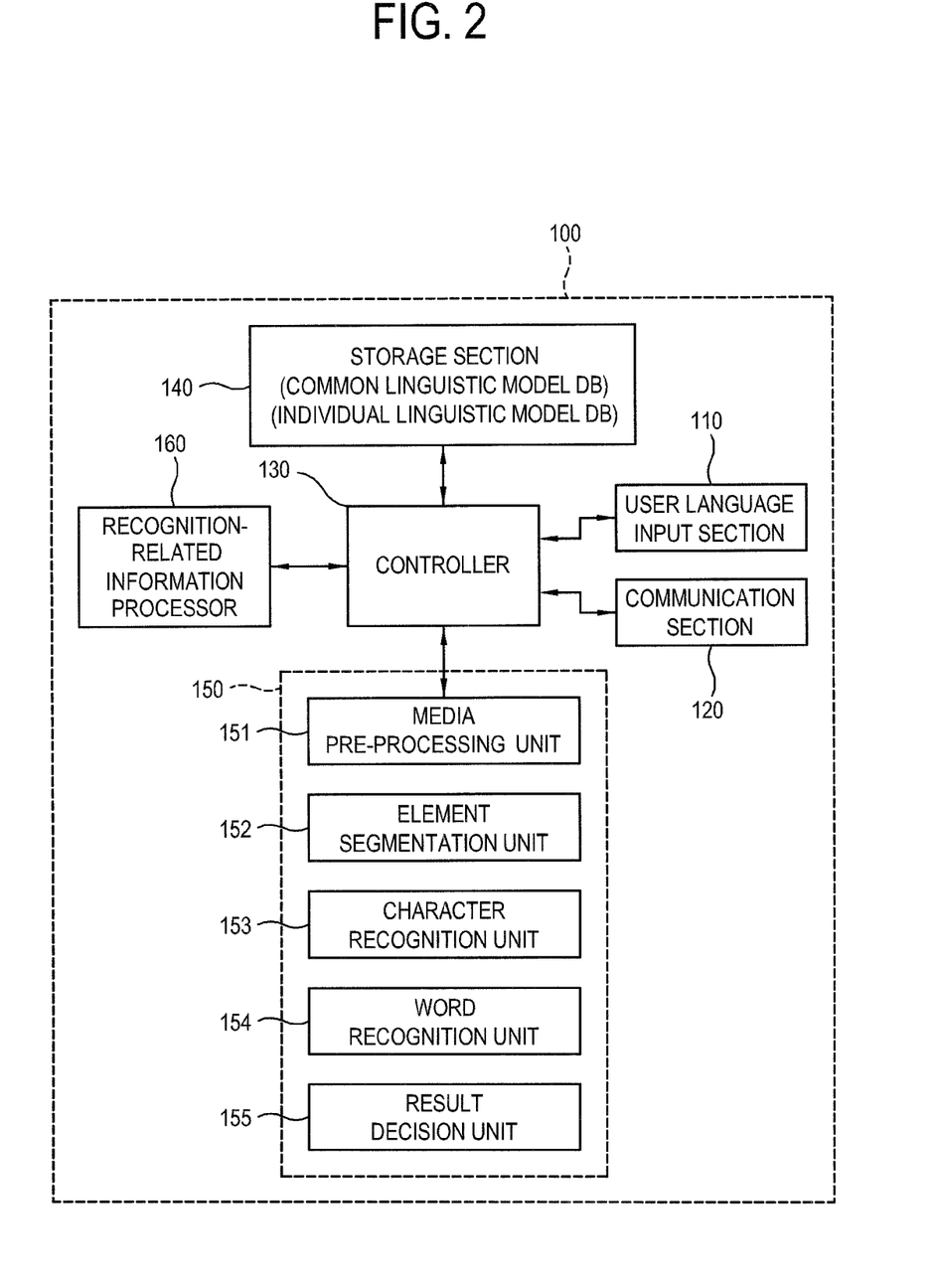
FIG. 2 is a block diagram showing a linguistic recognition device according to an embodiment of the present disclosure.

FIG. 2 is a block diagram showing a linguistic recognition device according to an embodiment of the present disclosure.

Referring to FIG. 2, a linguistic recognition device 100 includes a user language input section 110; a communication section 120 communicable with an external device (e.g., a cloud server) 300 (not shown); a storage section 140 storing common linguistic model data and individual linguistic model data; a controller 130 controlling components of the linguistic recognition device 100; a linguistic recognition engine 150 recognizing a language (e.g., a writing character) input through the user language input section 110; and a recognition-related information processor 160 processing recognition-related information with regard to a language used by a user in the linguistic recognition device 100 and acquiring individual linguistic model data.

In embodiments, the linguistic recognition device 100 may include a Television (TV), a mobile device such as a Smart phone, a computer, and the like devices with a means for inputting a character or voice.

In embodiments, the recognition-related information may include linguistic information such as a user's own individual language, that is, a word abbreviated by a user (i.e., an abbreviation); linguistic information to which an unusual ending type, or the like, is reflected; linguistic information mentioned by individuals on Social Network Service (SNS) or Short Message Service (SMS); linguistic information mentioned by user member groups on the SNS or SMS; and linguistic information such as a new-coined word, a buzzword, or the like, frequently used on the Web.

The user language input section 110 may include a user language input interface such as a keyboard, a mouse, a keypad, a touch screen, a microphone, etc.

The communication section 120 may access Internet through a wired/wireless router (i.e., an Access Point; not shown) for wired/wireless Internet connection. The communication section 120 may use data communication such as Very High Bit Rate Digital Subscriber Lines (VDSL), Ethernet, token ring, High Definition Multimedia Interface (HDMI), Universal Serial Bus (USB), component, Low Volume Dissemination System (LVDS), HEC; mobile communication such as $2^{nd}$ Generation (2G), 3G, 4G, Long Term Evolution (LTE); wireless Internet technology such as Wireless Local Area Network (WLAN, e.g., Wi-Fi), Wireless Broadband (Wibro), World Interoperability for Microwave Access (Wimax), High Speed Downlink Packet Access (HSDPA), or the like; local area network technology such as Bluetooth, Radio Frequency Identification (RFID), Infrared Data Association (IrDA), Ultra Wideband (UWB), ZigBee, or the like.

The controller 130 may control respective elements of the linguistic recognition device 100. In embodiments, the controller 130 may control the linguistic recognition engine 150 to recognize an input language, access the storage section 140 to store and delete data, and controls the communication section 110 to communicate with an external device 200.

The first controller controls the recognition-related information processor 160 to collect and analyze the recognition-related information used in the linguistic recognition device 100 and thus extract and store the individual linguistic model data.

The controller 130 may include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), micro-controllers, or microprocessors.

The storage section 140 stores nonrestrictive data. The storage section 140 is accessed by the controller 130 and performs reading, recording, modifying, deleting, updating and so on with regard to data. The data stored in the storage section 140 may for example include various linguistic data received in the user language input section 110, in an operating system, in various applications executable on the operating system, in video data, in added data, or the like.

The storage section 140 may store common linguistic model Database (DB) and individual linguistic model database (DB) individually related to a certain user.

The linguistic recognition engine 150 includes a media pre-processing unit 151 which acquires handwriting pixel information from an image input by writing, handwriting information based on writing order, or the like, and performs pre-processing for a media domain, i.e., removing noise from input information as necessary; an element segmentation unit 152 which segments an element such as a character from total input information in order to process the recognition; a character recognition unit 153 which recognizes each character corresponding to the minimum element for writing recognition as handwriting information base; a word recognition unit (sentence Recognition unit) 154 which stochastically infers a word or a sentence by comparing the recognized character with the word or sentence database (DB); and a result decision unit 155 which decides a final recognition result from results of recognition in a unit of a character or in a unit of a word or sentence. The linguistic recognition engine 150 may be achieved by software or hardware.

Figure 6:
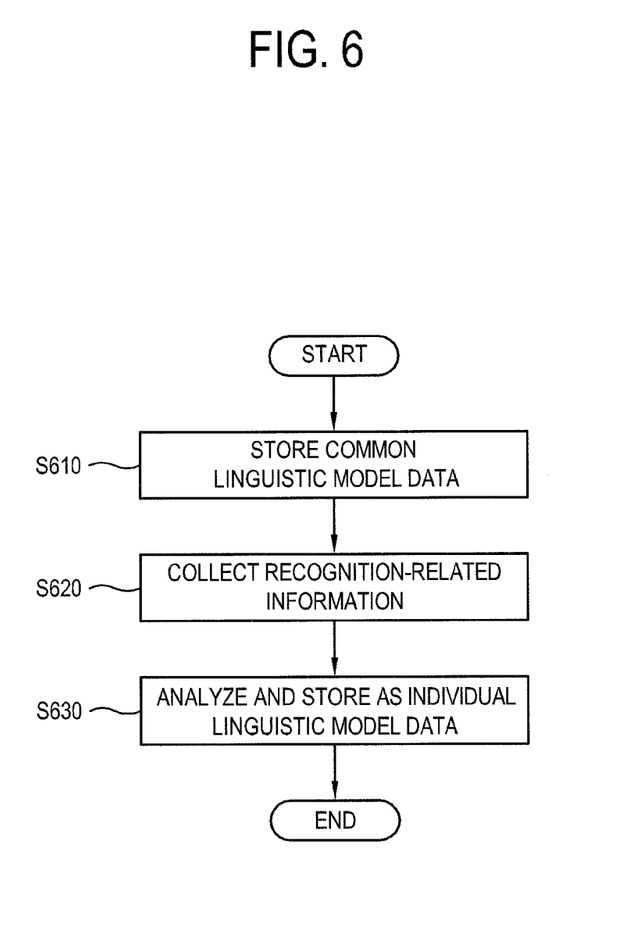
FIG. 6 is a flowchart showing a method of building a database for a linguistic recognition device according to an embodiment of the present disclosure.

FIG. 6 is a flowchart showing a method of building a database for a linguistic recognition device according to an embodiment of the present disclosure.

Referring to FIG. 6, a method of building database for the linguistic recognition device according to this embodiment includes the steps of storing common linguistic model data in the storage section of the linguistic recognition device in order to stochastically infer a word or a sentence from a character acquired by recognizing a language input by a user at operation S610; collecting the recognition-related information related to a user after storing the common linguistic model data at operation S620; and analyzing the collected recognition-related information to be stored as the individual linguistic model data at operation S630.

Referring again to FIG. 2, the storage section 140 may accumulate and store a variety of recognition-related information received in the linguistic recognition device 100. Of course, the recognition-related information may be stored in a compressed form.

The storage section 140 may include at least one storage medium type selected from among a flash memory type, a hard disk type, a multimedia card micro type, a card type memory (e.g., an SD or XD memory, etc.), a Random Access Memory (RAM), a Static Random Access Memory (SRAM), a Read Only Memory (ROM), an Electrically Erasable Programmable Read-Only Memory (EEPROM), Programmable Read-Only Memory (PROM), a magnetic memory, a magnetic disc, and an optical disc.

In the storage section 140, the common linguistic model data, i.e., linguistic model data basically provided by a device provider for typical linguistic recognition, is generally updated by a patch after a predetermined period of time elapses.

The common linguistic model data (DB) and the individual linguistic model data (DB) individually related to a specific user may be stored in different areas of the storage section 140 since they are different in an updating pattern.

The recognition-related information processor 160 collects and analyzes the linguistic recognition-related information used by a user in the linguistic recognition device 100 in order to acquire the individual linguistic model data, and stores it in the storage section 140 or updates it in real time. The recognition-related information processor 160 may be achieved by hardware involving software algorithm or software such as language searching and word extracting programs.

The collection and analysis of the recognition-related information may be achieved by collecting individual language in use and analyzing his/her own language type. There may be an abbreviated word (i.e., an abbreviation), an unusual ending type, or the like, that is different among users, and such a user's unique pattern is likely to get out of a range of the common linguistic model database. To this end, the linguistic recognition device 100 stores a user's input recognition result and analyzes its type to thereby determine a language type in main use.

In embodiments, the collection and analysis of the recognition-related information may include collecting individual mention information on the SNS or SMS, and analyzing a unique language type. That is, the recognition-related information processor 160 collects the mention information written by one user from the SNS and analyzes and determines a unique language type used on the SNS.

In embodiments, the collection and analysis of the recognition-related information may include collecting mention information according to user member groups on the SNS or SMS and analyzing a unique language type. That is, the recognition-related information processor 160 determines a user group related to a certain user by analyzing a relationship between users on the SNS or SMS, and determines a unique language type of a corresponding group by collecting and analyzing the mention information of users who belong to the determined user group.

In embodiments, the collection and analysis of the recognition-related information may include collecting and analyzing a new-coined word and a buzzword used frequently on the Web. That is, the recognition-related information processor 160 utilizes Web portal open API, or the like, on the Web to collect the new-coined word, the buzzword, or the like, which rapidly increases in a hitting rate, and thus determines a lifetime of the hitting rate through periodic monitoring.

In embodiments, the collection and analysis of the recognition-related information may include analyzing recognition information generated based on a user's account. If one user has many client devices, the recognition-related information generated in each client device may be stored and managed so as to share the recognition-related information among different client devices that s/he has.

Figure 7:
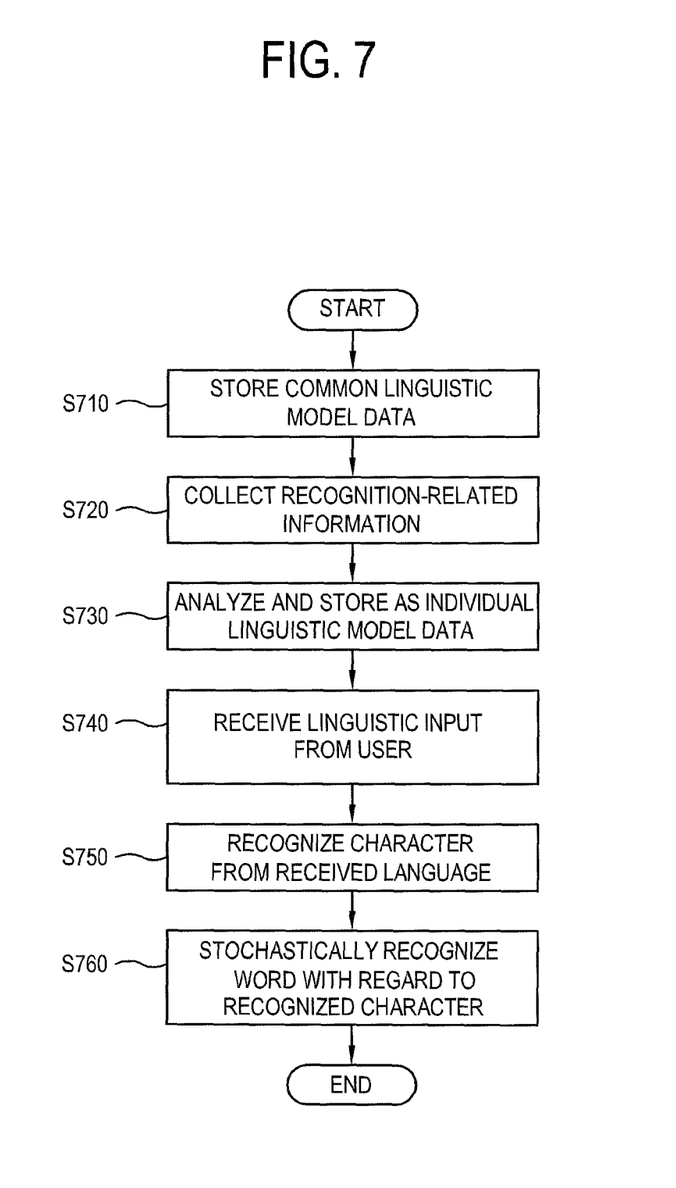
FIG. 7 is a flowchart showing a linguistic recognition method according to an embodiment of the present disclosure.

FIG. 7 is a flowchart showing a linguistic recognition method according to an embodiment of the present disclosure.

Referring to FIG. 7, the linguistic recognition method of the linguistic recognition device 100 in this embodiment includes the steps of storing the common linguistic model data for stochastically inferring a word or a sentence from the character acquired by recognizing the language input by a user in the storage section of the linguistic recognition device at operation S710; by collecting the recognition-related information related to the user after storing the common linguistic model data at operation S720; by analyzing the recognition-related information to be stored as the individual linguistic model data at operation S730; by receiving the linguistic input by a user at operation S740; by recognizing the character from the input language at operation S750; and by recognizing a word by stochastically inferring a word or a sentence from the recognized character based on the stored common linguistic model data and individual linguistic model data at operation S760.

In FIG. 2, the linguistic recognition device 100 can autonomously build the individual linguistic model database (DB) to recognize an individual input language. However, if the linguistic recognition device 100 is a Smartphone, or a like mobile terminal, battery power consumed in autonomously building the individual linguistic model database (DB) and updating it in real time may be excessive. Also, if every client device a user has includes the recognition-related information processor 160, it may be uneconomical.

Figure 3:
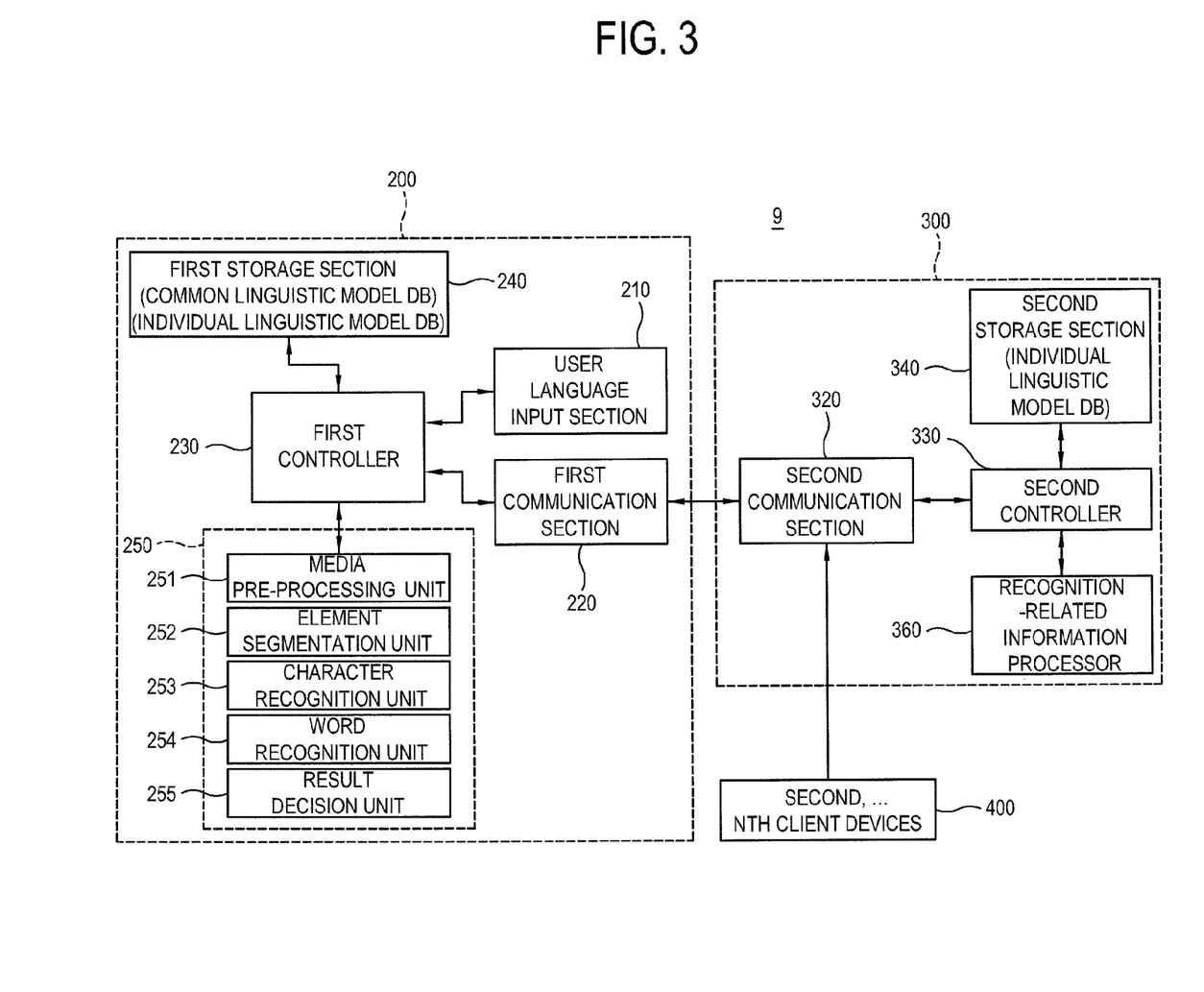
FIG. 3 is a block diagram showing a cloud based linguistic recognition system according to an embodiment of the present disclosure.
Figure 9:
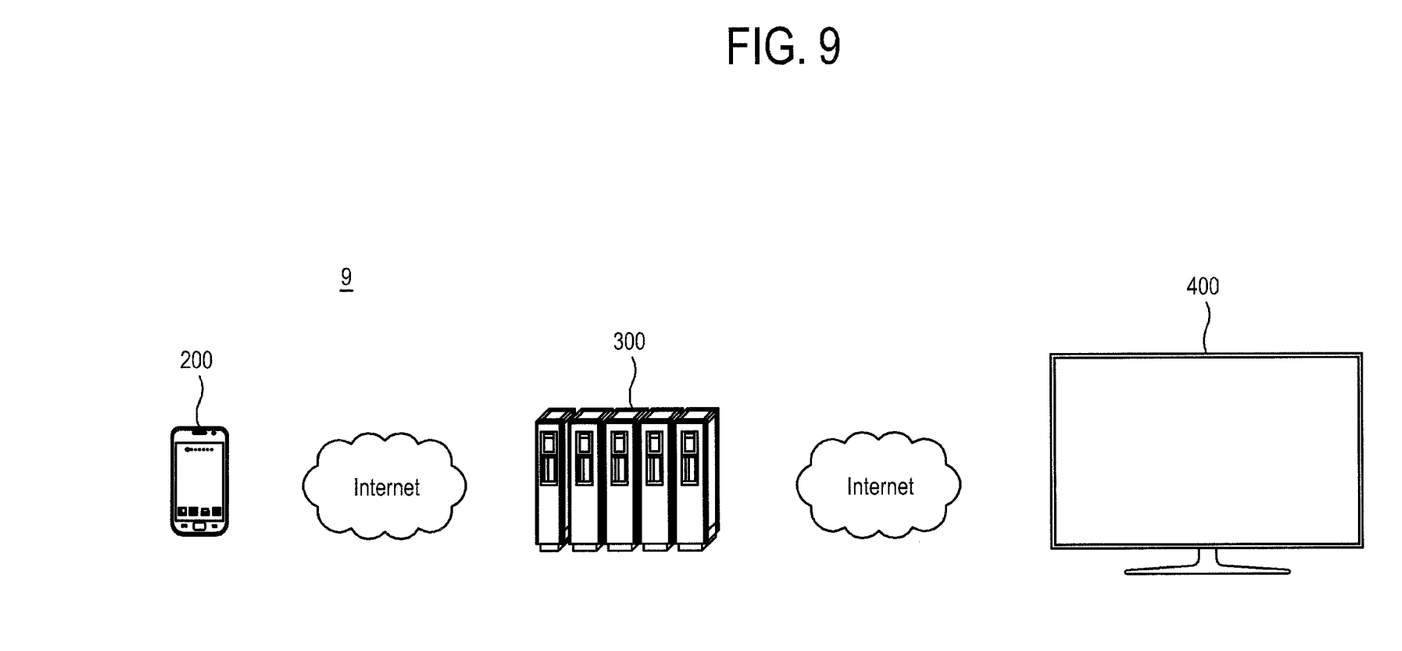
FIG. 9 is a schematic view showing a linguistic recognition device according to an embodiment of the present disclosure.

FIG. 9 is a schematic view showing a linguistic recognition system according to an embodiment of the present disclosure. FIG. 3 is a block diagram showing a cloud based linguistic recognition system according to an embodiment of the present disclosure.

Referring to FIGS. 9 and 3, the figures show a linguistic recognition system 9 that collects cloud based individual linguistic model data and stores and updates it in the client device.

Referring to FIG. 9, the cloud based linguistic recognition system 9 may include one or more client devices 200 and 400 and a cloud server 300 connected for communication to each client device.

Referring to FIG. 3, the client device 200 may include a user language input section 210, a first communication section 220 communicable with the cloud server 300, a first storage section 240 storing the common linguistic model data and the individual linguistic model data, a first controller 230 controlling components of the client device 200, and a linguistic recognition engine 250 recognizing a language (writing or voice) input through the user language input section 210.

The user language input section 210 may include a user language input interface such as a keyboard, a mouse, a keypad, a touch screen, a microphone, or the like.

The first communication section 220 may communicate with an external device such as the cloud server 300. The first communication section 220 may access the Internet through a wired/wireless router (e.g., an Access Point: not shown) for wired/wireless Internet connection. The first communication section 220 may use data communication such as VDSL, Ethernet, token ring, HDMI, USB, component, LVDS, HEC; mobile communication such as 2G, 3G, 4G, LTE; wireless Internet technology such as wireless local area network (WLAN, e.g., Wi-Fi), Wibro, Wimax, HSDPA, or the like; local area network technology such as Bluetooth, RFID, IrDA, UWB, ZigBee, or the like.

The first controller 230 may control respective elements of the client device 200. In embodiments, the first controller 230 may control the linguistic recognition engine 250 to recognize an input language, access the first storage section 240 to store and delete data, and controls the first communication section 210 to communicate with the cloud server 300.

The first controller 230 may include ASICs, DSPs, DSPDs, PLDs, FPGAs, micro-controllers, or microprocessors.

The first storage section 240 stores nonrestrictive data. The first storage section 240 is accessed by the controller 130 and performs reading, recording, modifying, deleting, updating and so on with regard to data. The data stored in the first storage section 240 may, for example, include various linguistic data received in the user language input section 210, in an operating system, in various applications executable on the operating system, in video data, in added data, or the like.

The first storage section 240 may store common linguistic model database (DB) and individual linguistic model database (DB) individually related to a certain user. Also, the first storage section 240 may accumulate and store a variety of recognition-related information received in the client device 200. Of course, the recognition-related information may be stored in a compressed form.

The first storage section 240 may include at least one storage medium type selected from among a flash memory type, a hard disk type, a multimedia card micro type, a card type memory (e.g., an SD or XD memory), RAM, SRAM, ROM, EEPROM, PROM, a magnetic memory, a magnetic disc, and an optical disc.

In the first storage section 240, the common linguistic model data, i.e., linguistic model data basically provided by a device provider for typical linguistic recognition, is generally updated by a patch after a predetermined period of time elapses.

The common linguistic model data (DB) and the individual linguistic model data (DB) individually related to a specific user may be stored in different areas of the first storage section 240 since they are different in an updating pattern.

The individual linguistic model data is received in the cloud server 300, and stored in the first storage section 240 or updated in real time.

The linguistic recognition engine 250 includes a media pre-processing unit 251 which acquires handwriting pixel information from an image input by writing, handwriting information based on writing order, and the like, and performs pre-processing for a media domain, i.e., removing noise from input information as necessary; an element segmentation unit 252 which segments an element such as a character from total input information in order to process the recognition; a character recognition unit 253 which recognizes each character corresponding to the minimum element for writing recognition as handwriting information base; a word recognition unit (e.g., a sentence recognition unit) 254 which stochastically infers a word or a sentence by comparing the recognized character with the word or sentence database (DB); and a result decision unit 255 which decides a final recognition result from results of recognition in a unit of a character or in a unit of a word or sentence.

Referring to FIG. 3, the cloud server 300 includes a second communication section 320 for communicating with client devices 100 and 200; a second storage section 340 for storing the individual linguistic model data acquired by analyzing the recognition-related information collected and transmitted by each client device; a recognition-related information processor 360 for analyzing the recognition-related information collected and transmitted by each client device; and a second controller 330 for controlling respective components of the cloud server 300.

The cloud server 300 may include a home server, a set-top box, a computer, or the like, which are connected through the networks.

The second communication section 320 may communicate with an external device such as the client devices 100, and 200. The second communication section 320 may access the Internet through a wired/wireless router (e.g., an Access Point: not shown) for wired/wireless Internet connection. The second communication section 320 may use data VDSL, Ethernet, token ring, HDMI, USB, component, LVDS, HEC, mobile communication such as 2G, 3G, 4G, LTE, WLAN, e.g., Wi-Fi, Wibro, Wimax, HSDPA, or the like; local area network technology such as Bluetooth, RFID, IrDA, UWB, ZigBee, or the like.

The second controller 330 may control respective elements of the cloud server 300. In embodiments, the second controller 330 may control the recognition-related information processor 360 to analyze the input recognition-related information and extract the individual linguistic model data. Also, the second controller 330 accesses the second storage section 340 to store or delete the data, and uses the second communication section 310 to transmit the individual linguistic model data of each client device 100, 200.

The second controller 330 may include ASICs, DSPs, DSPDs, PLDs, FPGAs, micro-controllers, or microprocessors.

The second storage section 340 stores nonrestrictive data. The second storage section 340 is accessed by the controller 130 and performs reading, recording, modifying, deleting, updating and so on with regard to data. The data stored in the second storage section 340 may, for example, include various pieces of linguistic recognition-related information received in each client device 100 and 200, in an operating system, in various applications executable on the operating system, in video data, in added data, or the like.

The second storage section 340 may store the individual linguistic model data acquired by receiving and analyzing a variety of recognition-related information used in each client device 200.

The second storage section 340 may include at least one storage medium type selected from among a flash memory type, a hard disk type, a multimedia card micro type, a card type memory (e.g., an SD or XD memory), a RAM, SRAM, a ROM), an EEPROM, a PROM, a magnetic memory, a magnetic disc, and an optical disc.

The recognition-related information processor 360 acquires the individual linguistic model data by collecting and analyzing the linguistic recognition-related information used by a user in the client devices 100 and 200, and stores it in the second storage section 340 or updates it in real time.

That is, the collection and analysis of the recognition-related information in the recognition-related information processor 360 may include collecting individual language in use in each client device and analyzing a unique language type.

Also, the collection and analysis of the recognition-related information in the recognition-related information processor 360 may include collecting individual mention information on the SNS or SMS, and analyzing a unique language type. That is, the recognition-related information processor 160 collects the mention information written by one user from the SNS through each client device and analyzes and decides a unique language type used on the SNS.

Also, the collection and analysis of the recognition-related information in the recognition-related information processor 360 may include collecting mention information according to user member groups on the SNS or SMS and analyzing a unique language type. That is, the recognition-related information processor 160 determines a user group related to a certain user by analyzing a relationship between users on the SNS OR SMS, and determines a unique language type of a corresponding group by collecting and analyzing the mention information of users who belong to the determined user group.

Also, the collection and analysis of the recognition-related information in the recognition-related information processor 360 may include collecting and analyzing a new-coined word and a buzzword used frequently on the Web. That is, the recognition-related information processor 160 utilizes Web portal open API, or the like, on the Web to collect the new-coined word, the buzzword, or the like, which rapidly increases in a hitting rate, and thus determines a lifetime of the hitting rate through periodic monitoring.

Thus, the collection and analysis of the recognition-related information in the recognition-related information processor 360 analyzes recognition information generated based on a user's account. If one user has many client devices, the recognition-related information generated in each client device may be stored and managed so as to share the recognition-related information among different client devices that s/he has.

Figure 8:
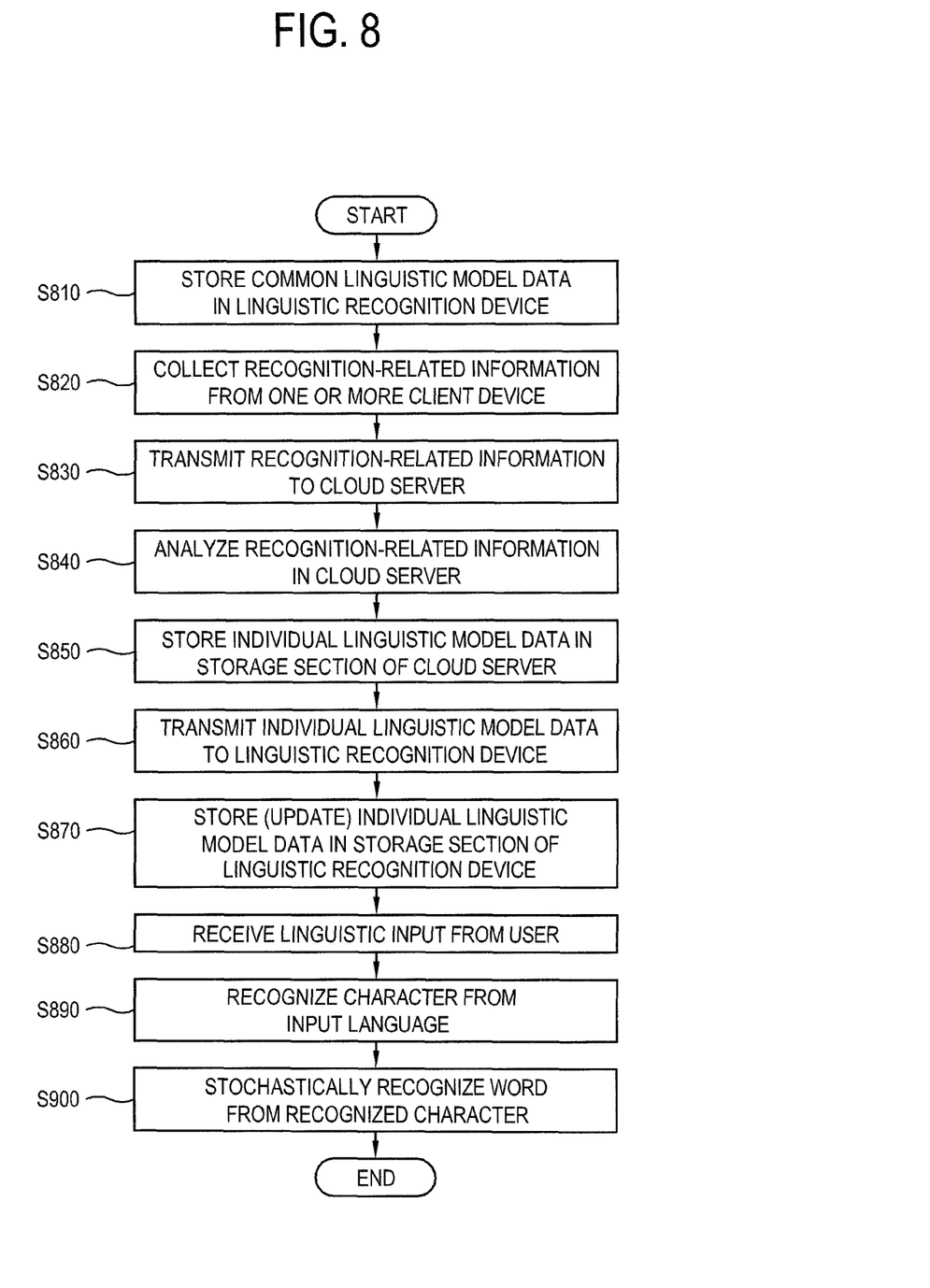
FIG. 8 is a flowchart showing a cloud based linguistic recognition method according to an embodiment of the present disclosure.

FIG. 8 is a flowchart showing a cloud based linguistic recognition method according to an embodiment of the present disclosure.

Referring to FIG. 8, the cloud based linguistic recognition method according to an embodiment includes the steps of storing the common linguistic model data in the storage section 240 of the linguistic recognition device 200 in order to stochastically infer a word or a sentence from the character acquired by recognizing the language input by a user at operation S810; collecting a variety of recognition-related information related to a user in at least one client device 200, 400 including the linguistic recognition device 100 at operation S820; transmitting the recognition-related information collected in the respective client devices for a predetermined period of time to the cloud server 300 at operation S830; extracting the individual linguistic model data by analyzing the recognition-related information received in the recognition-related information processor 360 of the cloud server 300 at operation 5840; storing the individual linguistic model data extracted by the recognition-related information processor 360 in the second storage section 340 at operation S850; transmitting the stored individual linguistic model data to the linguistic recognition device 200 at operation S860; storing (updating) the received individual linguistic model data in the first storage section 240 of the linguistic recognition device 200 at operation S870; receiving a language input by a user at operation S880; recognizing the character from the input language at operation S890; and recognizing a word by stochastically inferring a word or a sentence based on the stored common linguistic model data and the stored individual linguistic model data with respect to the recognized character at operation S900.

Below, operations of the cloud based linguistic recognition system according to an embodiment will be described.

In an embodiment, preconditions may be as follows.

1. On the premise that SNS user account information stored in the linguistic recognition device (i.e., the client device) is stored in consolidated user account on a cloud, a step of asking for the consent of using user information may be performed.
2. With a consolidated user account, a real time popular search word, or the like, may be acquired through a Web Portal open API, Web Crawling, or the like (i.e., information collection before doing the recognition).

3. With a SNS user account, user mention contents are taken from an SNS site.
4. Natural Language Processing (NLP) is utilized to analyze and determine a language pattern such as a word, a tone of voice, or the like, and is mainly used by a user from the acquired user mention contents
5. The open API, the Web Crawling, or the like, is used to acquire a real time search word, a new-coined word, a buzzword, or the like (hereinafter referred to as a 'new-coined word'), from the Web Portal.
6. The acquired new-coined word is monitored in a defined cycle, and thus the lifetime thereof is determined to thereby determine a point of time to add or delete the new-coined word.
7. The linguistic recognition device stores recognition results such as writing, voice, or the like, in the consolidated user account, and analyzes linguistic features of a user's input information by analyzing the stored recognition results. Besides the recognition results, linguistic features of the use of a word, a change in endings, or the like, of the SMS are also analyzed. The information about the individual linguistic features collected and analyzed as above is stored in the consolidated user account on a cloud, and a hitting rate, or the like, is analyzed to determine a user's linguistic feature information (i.e., building and synchronization of individual linguistic model DB for cloud based recognition)
8. Information to be added to or deleted from a relevant user's linguistic model DB are determined based on recognition-related linguistic feature information collected from each client device (i.e., the linguistic recognition device), the SNS, the Web, or the like. All the linguistic feature information of the individual linguistic model DB is determined whether to be added or deleted by considering the hitting rate.
9. Version information, or the like, of the individual linguistic model DB in the linguistic recognition device is checked to update and synchronize the individual linguistic model DB between the cloud server and the linguistic recognition device.

In an embodiment, terminal recognition using the individual linguistic model DB may occur as follows.

10. The linguistic recognition device additionally performs a general recognition step such as a letter recognition step, a word recognition step utilizing the common linguistic model DB, or the like and a word recognition step utilizing the individual linguistic model DB.
11. The recognition results are transmitted to and stored in the cloud server.

Figure 4:
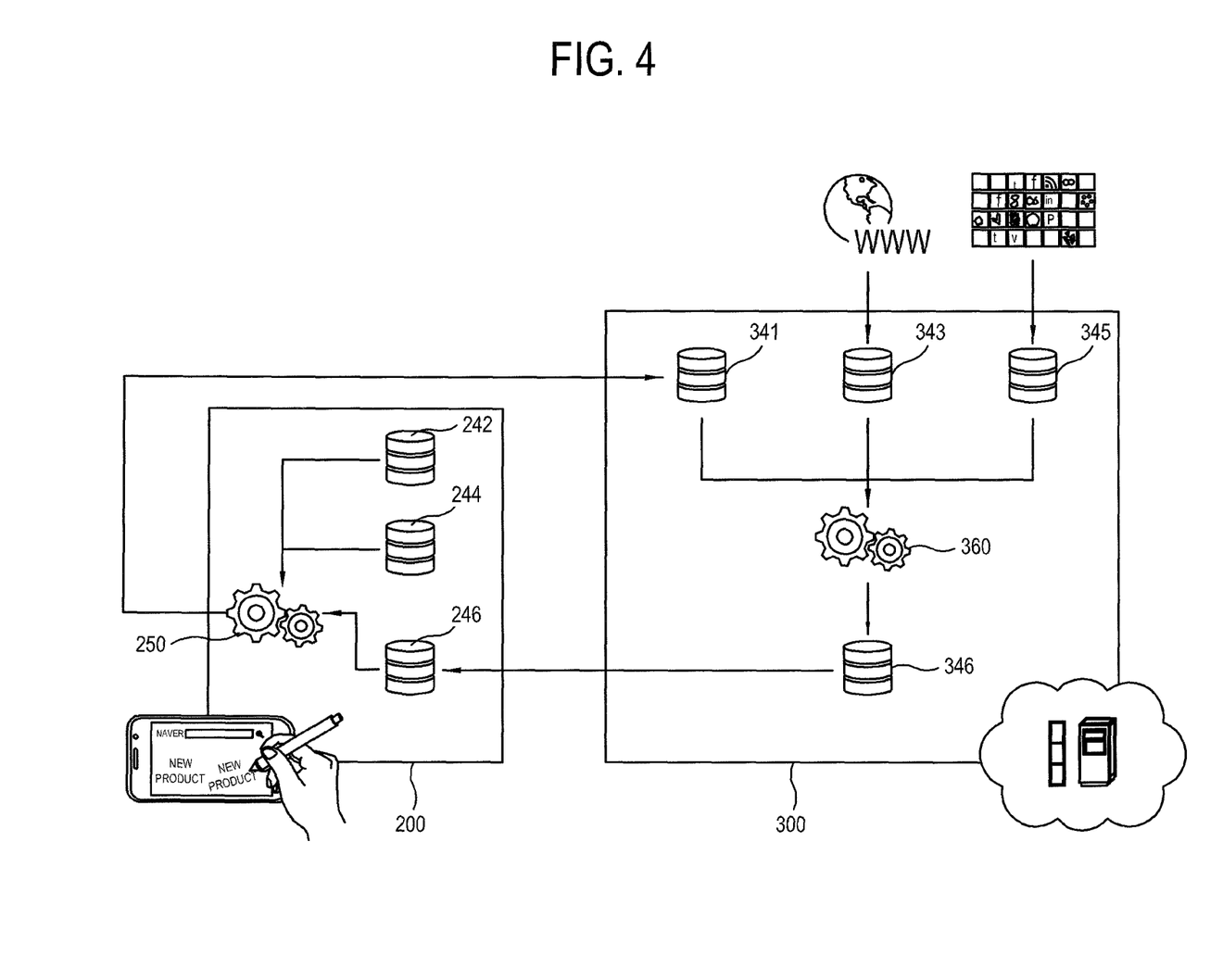
FIG. 4 is a schematic view showing a data management method related to cloud based linguistic recognition according to an embodiment of the present disclosure.

FIG. 4 is a schematic view showing a data management method related to cloud based linguistic recognition according to an embodiment of the present disclosure.

Referring to FIG. 4, the linguistic recognition device 200 includes a handwriting model DB 242 for character recognition of the handwriting recognition engine 250, a common linguistic model DB 244, and an individual linguistic model DB 246 according to the present disclosure.

The cloud server 300 may include an individual use word DB 341 where a user's input words in the respective client devices (i.e., the linguistic recognition devices) are collected and stored; a common new-coined word crawling DB 343 where new-coined words, or the like, on the Web are collected and stored; and an individual SNS use word DB 345 where a user's input words on the SNS are collected and stored. The individual use word DB 341, the common new-coined word crawling DB 343, and the individual SNS use word DB 345 are just described by way of example, but not limited thereto. Alternatively, another kind of DB may be added as necessary.

The recognition-related information processor 360 of the cloud server 300 analyzes the recognition-related information stored in the individual use word DB 341, in the common new-coined word crawling DB 343, and in the individual SNS use word DB 345, and thus extracts the individual use words or new-coined words excluding from the common linguistic model DB, thereby storing (i.e., updating) an individual linguistic model DB 346 with the extracted individual use words or new-coined words. The cloud server 300 uses the extracted individual use words or new-coined words stored (i.e., updated) in the individual linguistic model DB 346 to thereby periodically update the individual linguistic model DB 246 of the linguistic recognition device 200.

Figure 5:
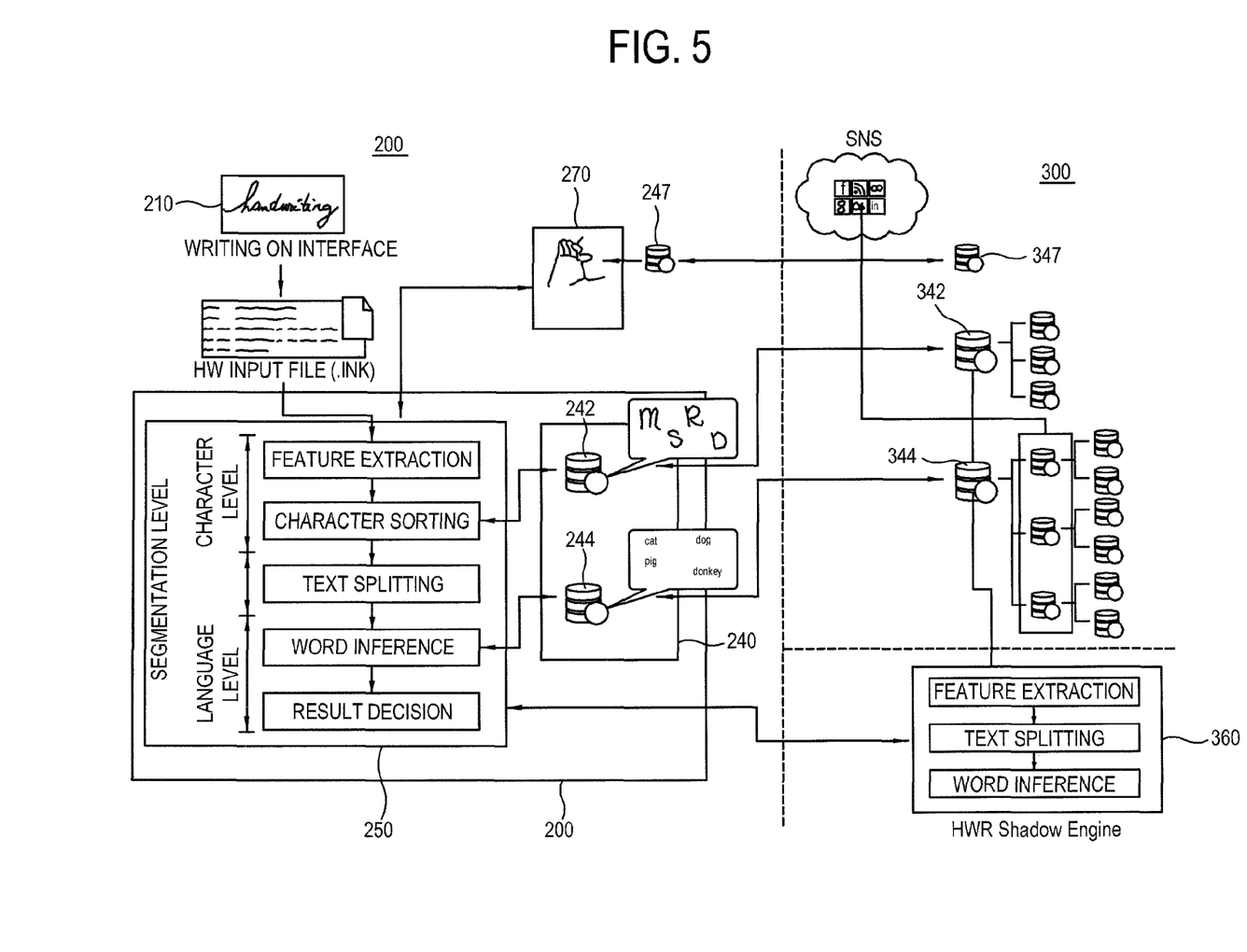
FIG. 5 is a schematic view showing a writing recognition system where cloud based user linguistic model data is managed according to an embodiment of the present disclosure.

FIG. 5 is a schematic view showing a writing recognition system where cloud based user linguistic model data is managed according to an embodiment of the present disclosure.

Referring to FIG. 5, the linguistic recognition device 200 generates a handwriting input file (e.g., .ink) based on handwriting input on a user input interface 210, and then performs linguistic recognition by carrying out feature extracting, character sorting, text splitting, word inferring and result decision through the writing recognition engine 250 according to the present disclosure. The foregoing handwriting recognition may use an alphabet DB 242 and a linguistic model DB 244 stored in the first storage section 240 of the linguistic recognition device 200.

The cloud server 300 may include a user use alphabet DB 342 received from one or more connected client devices, and an individual linguistic model DB 344. The individual linguistic model DB 344 of the cloud server 300 may be additionally updated with an individual use word directly input from the exterior, new-coined words on the Web, or the like. That is, the linguistic model DB 344 of the cloud server 300 includes the individual linguistic model data extracted by analyzing the recognition-related information received from the exterior through the recognition-related information processor 360 of the cloud server 300.

The alphabet DB 242 and the linguistic model DB 244 of the linguistic recognition device 200 may include the common linguistic model data and the individual linguistic model data. The alphabet DB 242 and the linguistic model DB 244 stored in the linguistic recognition device 200 may be periodically updated with the alphabet DB 342 and the linguistic model DB 344 stored in the cloud server 300 connected via a network.

Also, the linguistic recognition device 200 may include a voice recognition engine 270 embedded with a voice DB 247 for voice recognition. Likewise, the voice DB 247 embedded in the voice recognition engine 270 may be periodically updated with a voice DB 347 of the cloud server 300.

According to an embodiment, it is expected that in a recognition-related individual linguistic model database corresponding to individual or member groups, new-coined words on the Web are used to improve performance of recognition difficult to be processed by the common linguistic model database.

Also, it is expected that common recognition performance for a plurality of users is secured through a common linguistic model database, and additional recognition performance for a specific user is improved through individual recognition information management.

In embodiments, a hitting rate of a new-coined word, or the like, is traced and thus the new-coined word is added to or deleted from the individual linguistic model database in accordance with the hitting rates, thereby optimizing management of the individual linguistic model database.

In embodiments, the recognition-related information is managed based on a user account on a cloud server, thereby reflecting accumulated user-specified training results on to one or more client devices used by a user.

Although a few embodiments have been shown and described, it will be appreciated by those skilled in the art that changes may be made in these embodiments without departing from the principles and spirit of the disclosure, the scope of which is defined in the appended claims and their equivalents.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A non-transitory processor readable medium for storing a database, the database being configured to be readable by at least one processor for instructing the at least one processor to execute a computer process,
wherein the database comprises:
common linguistic model data configured to be accessible by the at least one processor to stochastically infer a word or a sentence from a character acquired by recognizing a language input by a user; and
individual linguistic model data configured to be accessible by the at least one processor to stochastically infer an individual use word or an individual use sentence related to the user by collecting recognition-related information transmitted through one or more client devices used by the user after storing the common linguistic model data, and wherein the at least one processor is configured to:
analyze the collected recognition-related information, which is used by the user of a linguistic recognition device, to acquire the individual linguistic model data,
extract the individual use word excluded from the common linguistic model data, and
store the extracted individual use word as the individual linguistic model data.

2. The non-transitory processor readable medium according to claim 1, wherein the individual linguistic model data is acquired by at least one of analyzing an individual unique language pattern, analyzing a user member group language pattern, and analyzing a real-time word on the Web.

3. The non-transitory processor readable medium according to claim 1, wherein the stored individual linguistic model data is updated with individual linguistic model data stored in a cloud server.

4. The non-transitory processor readable medium according to claim 1, wherein the common linguistic model data and the individual linguistic model data are respectively stored in different data areas of the storage.

5. The non-transitory processor readable medium according to claim 3, wherein the individual linguistic model data of the cloud server is acquired by analyzing the recognition-related information collected and transmitted through one or more client devices used by the user.

6. The non-transitory processor readable medium according to claim 5, wherein the recognition-related information is collected for a predetermined period of time through one or more client devices used by a user and transmitted.

7. The non-transitory processor readable medium according to claim 1, wherein the language input by the user comprises a voice or a character.

8. A method of building a database for a linguistic recognition device, the method comprising:
storing common linguistic model data configured to be accessible by at least one processor to stochastically infer a word or a sentence from a character acquired by recognizing a language input by a user in a storage section of the linguistic recognition device;
collecting recognition-related information related to the user after storing the common linguistic model data;
analyzing the collected recognition-related information to be stored as individual linguistic model data;
extracting an individual use word or an individual use sentence excluded from the common linguistic model data, and
storing the extracted individualistic use word as the individual linguistic model data.

9. The method according to claim 8, wherein the individual linguistic model data is acquired by at least one of analyzing an individual unique language pattern, analyzing user member group language pattern, and analyzing a real-time word on the Web.

10. The method according to claim 9, wherein the analysis is performed in a cloud server, and the analyzed and acquired individual linguistic model data is stored in a storage section of the cloud server.

11. The method according to claim 10, wherein the analysis is performed with respect to recognition-related information collected and the recognition-related information is transmitted through one or more client devices used by the user.

12. The method according to claim 11, wherein the recognition-related information is collected for a predetermined period of time and transmitted to the cloud server.

13. The method according to claim 10, wherein the stored individual linguistic model data is updated with the individual linguistic model data stored in the cloud server.

14. A linguistic recognition device, the device comprising:
a user language input section through which a user inputs a language;
a character recognition unit configured to recognize a character from the language input through the user language input section;
a database; and
a word recognition unit configured to stochastically infer a word or a sentence based on common linguistic model data and individual linguistic model data stored in a storage section from the character recognized by the character recognition unit,
wherein the database comprises:
the common linguistic model data configured to stochastically infer the word or the sentence from the character acquired by recognizing the language input by the user; and
the individual linguistic model data configured to stochastically infer an individual use word or an individual use sentence related to the user by collecting recognition-related information transmitted through one or more client devices used by the user after storing the common linguistic data and analyzing the collected recognition-related information, and
wherein the word recognition unit is further configured to:
extract the individual use word excluded from the common linguistic model data, and
store the extracted individual use word as the individual linguistic model data.

15. The linguistic recognition device according to claim 14, wherein the individual linguistic model data is acquired by at least one of analyzing an individual unique language pattern, by analyzing a user member group language pattern, and by analyzing a real-time word on the World Wide Web.

16. The linguistic recognition device according to claim 14, further comprising:
a communication section which communicates with a cloud server.

17. The linguistic recognition device according to claim 16, wherein the recognition-related information is collected for a predetermined period of time through one or more client devices used by the user and transmitted to the cloud server through the communication section.

18. The linguistic recognition device according to claim 14, wherein the user language input section comprises at least one of a voice input microphone and a character input interface.

19. A linguistic recognition method, the method comprising:
building a database;
receiving a language input by a user;
recognizing a character from the input language; and
recognizing a word by stochastically inferring the word or a sentence based on stored common linguistic model data and individual linguistic model data from the recognized character,
wherein the database comprises:
the common linguistic model data configured to stochastically infer the word or the sentence from the character acquired by recognizing a language input by the user, and
the individual linguistic model data configured to stochastically infer an individual use word or an individual use sentence related to the user by collecting recognition-related information through one or more client devices used by the user after storing the common linguistic data and analyzing the collected recognition-related information, and
wherein the individual use word is excluded from the common linguistic model data.

20. The method according to claim 19, wherein the individual linguistic model data is acquired by at least one of analyzing an individual unique language pattern, analyzing user member group language pattern, and analyzing a real-time word on the World Wide Web.

* * * * *